June 2, 1970   G. K. CORNISH ET AL   3,514,929
CONTROL SYSTEM FOR A HARVESTING MACHINE
Filed Aug. 21, 1967   3 Sheets-Sheet 1

INVENTOR.
G. K. CORNISH
G. F. PENFOLD

June 2, 1970    G. K. CORNISH ET AL    3,514,929
CONTROL SYSTEM FOR A HARVESTING MACHINE
Filed Aug. 21, 1967    3 Sheets-Sheet 3
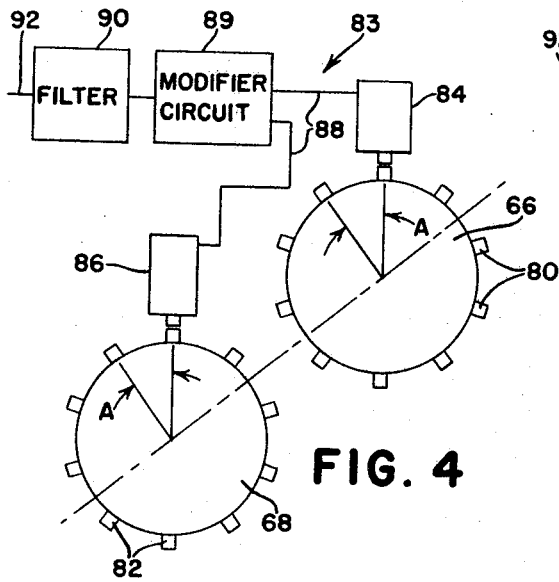
FIG. 4
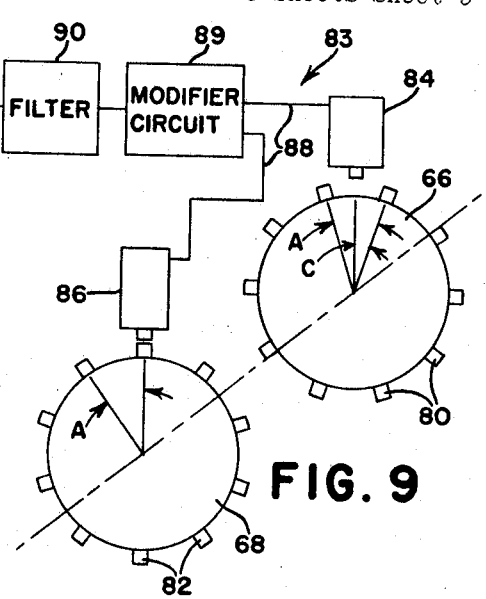
FIG. 9
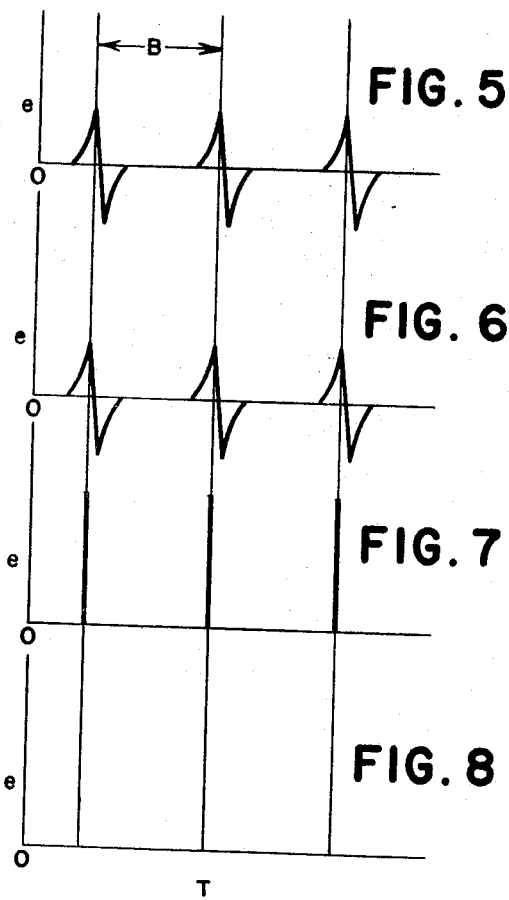
FIG. 5
FIG. 6
FIG. 7
FIG. 8
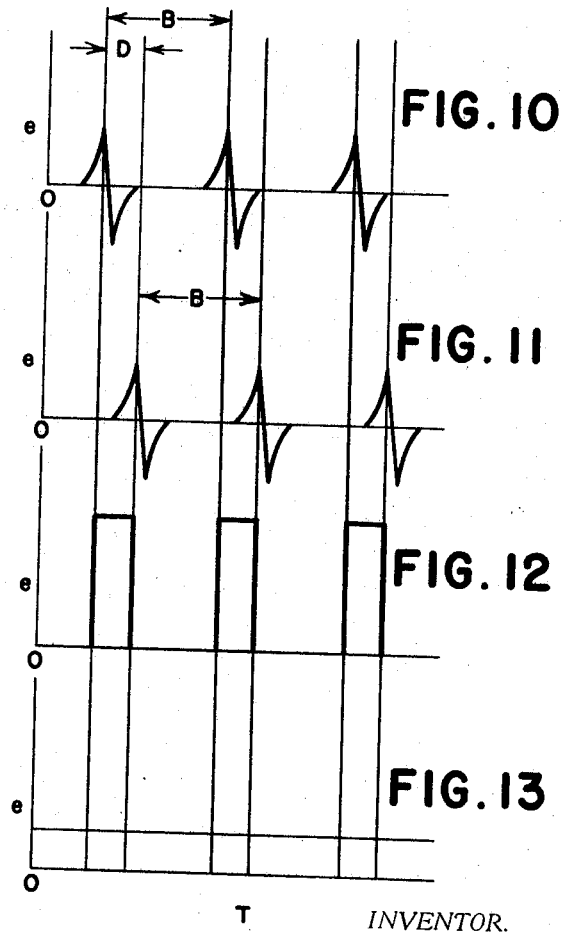
FIG. 10
FIG. 11
FIG. 12
FIG. 13
INVENTOR.
G. K. CORNISH
G. F. PENFOLD

# United States Patent Office 3,514,929
Patented June 2, 1970

3,514,929
CONTROL SYSTEM FOR A HARVESTING MACHINE
George Kent Cornish and Garn Farley Penfold, East Moline, Ill., assignors to Deere & Company, Moline, Ill., a corporation of Delaware
Filed Aug. 21, 1967, Ser. No. 662,015
Int. Cl. A01d 41/02
U.S. Cl. 56—21                        6 Claims

ABSTRACT OF THE DISCLOSURE

A self-propelled combine having an infinitely-variable speed propulsion drive, a grain harvesting header, a torque sensing device in the header drive shaft for producing an electric signal proportionate to the torque in the header drive, and a control system for maintaining the ground speed of the combine at a rate which provides a constant predetermined torque in the header drive within a predetermined maximum combine speed.

BACKGROUND OF THE INVENTION

This invention relates to a control system for automatically adjusting the ground speed of a harvesting machine to maintain a relatively constant crop feed rate to the machine.

Several types of control mechanisms are known for coordinating the ground speed and the crop feed rate on self-propelled combines. The present invention represents an improvement over the known control systems. One disadvantage of some previous systems has resided in the fact that the ground speed was not reduced until after an excessive feed rate had overloaded the threshing cylinder or the engine. However, when this occurred, there was generally an excessive amount of material in the machine ahead of the threshing cylinder, so that there was a substantial delay between the initial overload signal and the return of the machine to the desired feed rate. To overcome this, it is known to sense the crop feed rate by measuring the torque at the cutter bar. However, this has proved to be unsatisfactory since the torque in the cutting mechanism for a given feed rate is varied by such uncontrollable factors as the weed content or moisture conditions in the straw.

Another defect of known control systems resides in the fact that such systems are constant torque systems only, and in light crop conditions the ground speed of the machine could become excessive.

SUMMARY OF THE INVENTION

The present invention provides a system which can be characterized as a combination constant feed rate-maximum speed system, wherein the combine will not exceed a predetermined ground speed regardless of the crop feed rate.

Also, according to the present invention, the feed rate of the crop is sensed by measuring the total power input to the header. Sensing at this location provides sufficiently early detection of an overload condition to avoid substantial plugging of the machine, while measuring the sum of the power consumed by the different header components reduces the sensitivity of the sensing to brief overloads of one of the components or to variations in the crop conditions which might affect one of the header components and not another.

Another feature of the present invention resides in the novel device for sensing the torque in the header drive and producing an electric signal which is a function of the header drive torque. Still another feature of the control system resides in the fact that the preset crop feed rate and the preset maximum ground speed can easily be varied by the operator from the operator's station. Another feature of the control system resides in the fact that the system can easily be installed as an option on new combines or easily installed on machines already in the field, and further that the system is an electric type system with a compact and durable construction which does not complicate or interfere with the other combine components.

BRIEF DESCRIPTION OF THE DRAWINGS

FIG. 4 is a schematic illustration of the torque sensing device in a no load condition with the relatively rotatable elements in phase.

FIGS. 5 and 6 are graphs of the voltage vs. time produced by the sensing device under no load condition as shown in FIG. 4.

FIG. 7 is a graph of the voltage vs. time of the output of a modifier circuit which compares the electric signals shown in FIGS. 5 and 6.

FIG. 8 is a graph of voltage vs. time of the feed rate signal which is the output of a filter having the input shown in FIG. 7.

FIG. 9 is a schematic view similar to FIG. 4 showing the relatively rotatable elements of the sensing device out of phase when the sensing device is under a torque load.

FIGS. 10 and 11 are respectively similar to FIGS. 5 and 6 but showing the signals when the sensing device is under torque as shown in FIG. 9.

FIGS. 12 and 13 are respectively similar to FIGS. 7 and 8 but showing the outputs of the modifier circuit and filter when the sensing device is under torque as shown in FIG. 9.

DESCRIPTION OF THE PREFERRED EMBODIMENT

Figure 1:
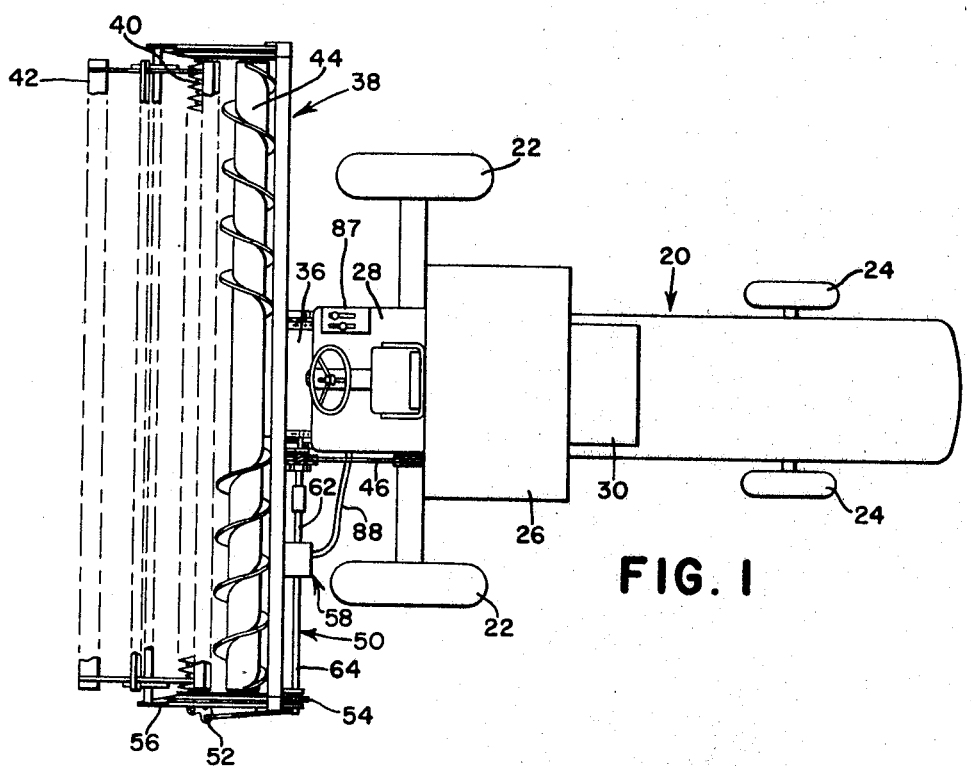
FIG. 1 is a plan view of a typical grain harvesting combine embodying the present invention.

The harvesting machine chosen for the purpose of illustrating the control system is a self-propelled combine having a main separator body 20 mounted on a pair of forward drive wheels 22 and steerable rear wheels 24. The body includes an elevated grain tank 26 and a forward operator's station 28 immediately forward of the grain tank 26. A power source 30, conventionally an internal combustion engine, is mounted on the combine body 20 rearwardly of the grain tank 26 and the drive wheels 22 are connected to and driven by the engine 30 through an infinitely-variable transmission 32. The infinitely-variable transmission is not shown in FIG. 1 and is illustrated only by a functional box in FIG. 2, since such infinitely-variable transmissions are conventional on combines, both infinitely-variable belt-type drives, such as disclosed in U.S. Pat. 2,639,569, and infinitely-variable hydrostatic-type drives being widely utilized.

Figure 2:
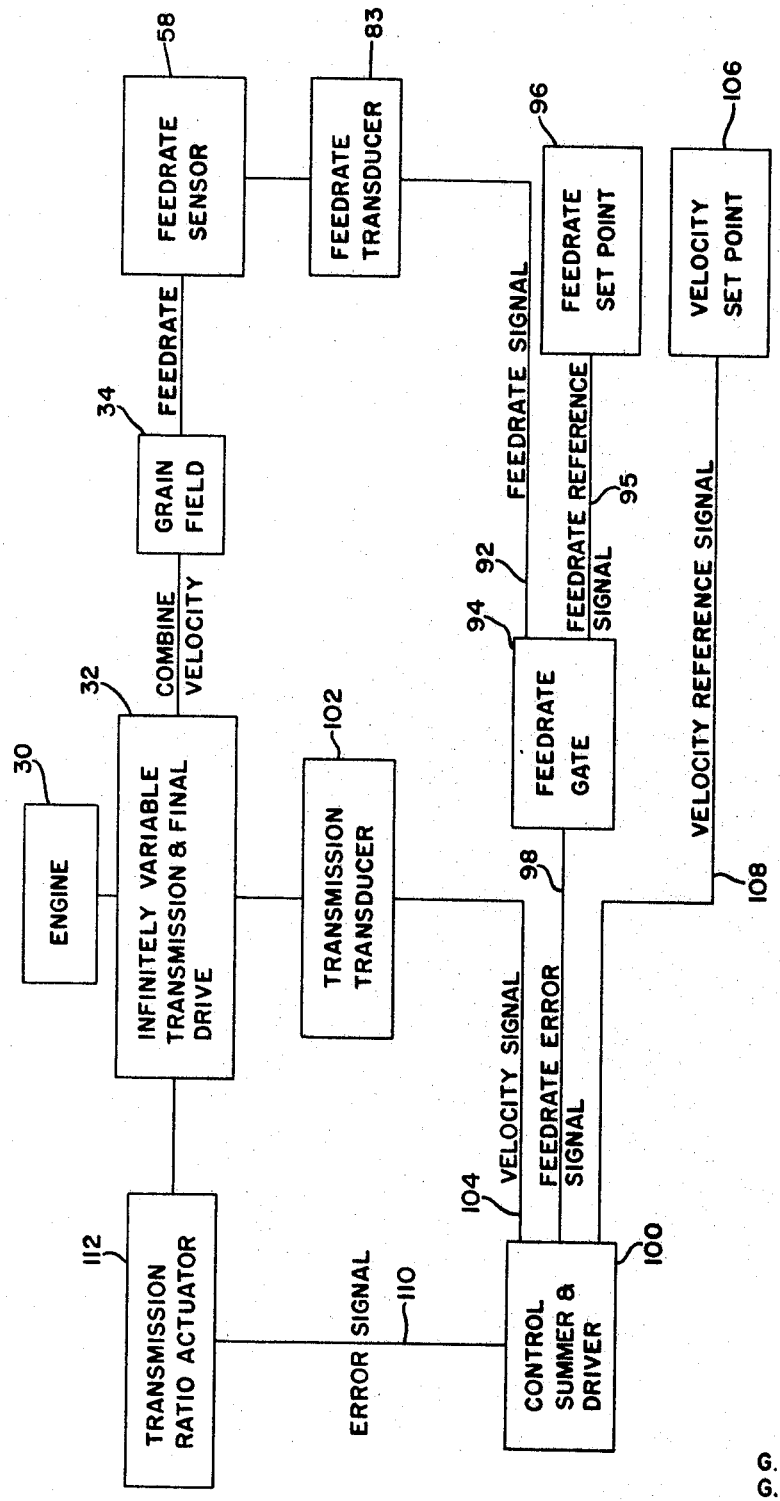
FIG. 2 is a block diagram of the entire control system.

The engine 30 is governed to operate at the relatively constant speed and drives the separating mechanism (not shown) within the combine body 20 at a constant speed while propelling the combine at variable speeds according to the ratio in the infinitely-variable transmission 32, the feed rate of the crop to the separating mechanism of course being a function of the ground speed of the combine as it moves through the field, which is represented by the functional box 34 in FIG. 2.

The crop is fed to the separating mechanism through a fore-and-aft forwardly disposed feeder house 36, which typically includes a fore-and-aft conveyor means (not shown) for moving the crop rearwardly to the separating mechanism. Mounted on the front end of the feeder house 36 is a transversely elongated grain harvesting platform or header 38, including a transverse mower bar 40 along its leading edge, a forward reel 42 above the mower bar 40, and a transverse auger 44 having oppositely wound flights at opposite ends for receiving the crop after it is severed from the field by the mower bar, converging it toward the center of the platform, and delivering it rearwardly to the feeder house conveyor. The feeder house conveyor is driven at a constant speed by a belt-type drive 46, which is connected to and driven by the engine 30, and the mower bar, reel, and auger are driven by a header drive, which includes a transverse drive shaft 50, having one end connected to and driven by the feeder house conveyor drive 46. The opposite end of the shaft 50 is connected to the mower bar 40 by a pitman-type mower drive 52, to the auger 44 by a chain-type auger drive 54, and to the reel 42 by a belt-type drive 56.

Figure 3:
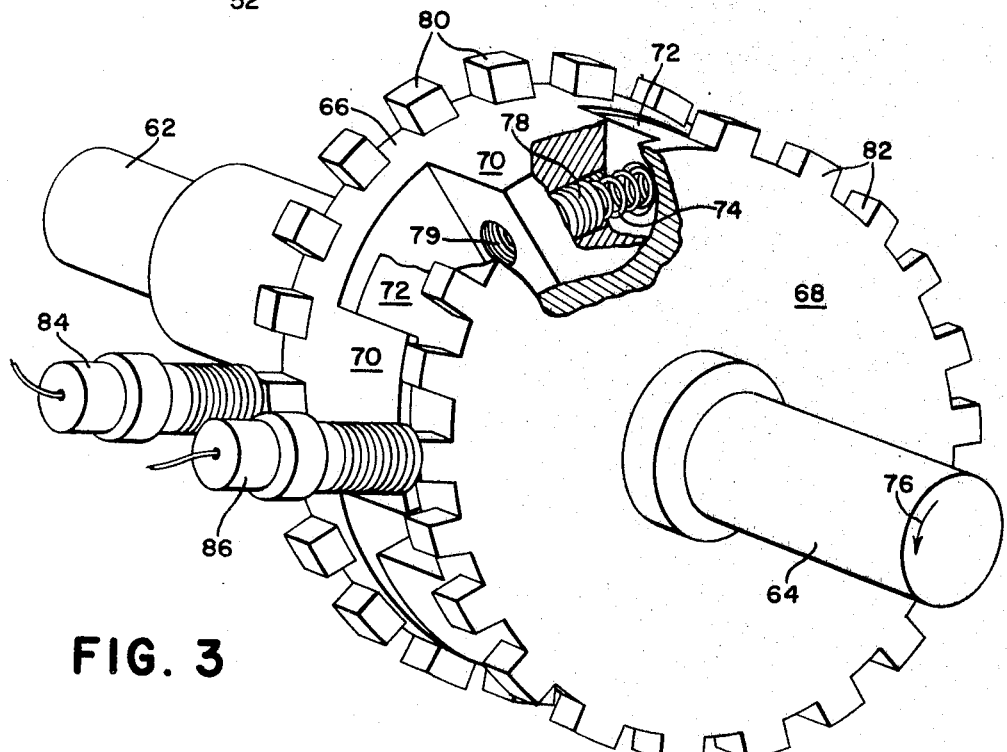
FIG. 3 is an enlarged perspective view of the torque sensing device with a portion of the device broken away to reveal the torque resisting spring.

Mounted in the shaft 50 is a torque sensing device indicated in its entirety by the numeral 58, the torque sensing device being represented by the functional box 58 in FIG. 2. The shaft 50 includes coaxial relatively rotatable drive and driven portions 62 and 64 respectively, and the sensing device includes adjacent cylindrical drive and driven elements 66 and 68 respectively coaxially affixed to the drive and driven shaft portions 62 and 64. The opposite radial faces of the elements 66 and 68 are respectively provided with meshing teeth or tangs 70 and 72, the meshing teeth 70 and 72 being provided with substantial backlash to permit limited relative rotation between the elements 66 and 68. The driving torque in the shaft 50 is transmitted between the elements 66 and 68 through a plurality of circumferentially extending helical-type tension springs 74 having their opposite ends respectively connected to adjacent teeth 70 and 72, the springs 74 biasing the elements 66 and 68 in the opposite direction from the driving torque in the shaft 50, the normal direction of rotation of the shaft 50 being in the direction of the arrow 76 in FIG. 3. Each spring 74 is connected to its respective tooth 70 through a threaded member 78, which is threadable in a circumferentially extending threaded aperture 79 through the tooth 70 to vary the preload on the springs 74. When the torque exceeds the force exerted by the preload on the springs 74, the elements will rotate relative to each other, the amount of relative angular movement between the members 66 and 68 depending on the extension of the springs 74, which in turn depends on the torque transmitted through the springs 74. The maximum amount of relative movement between the elements 66 and 68 is determined by the backlash between the teeth 70 and 72.

The elements 66 and 68 have a relatively large number of radial teeth or projections 80 and 82 respectively, the teeth 80 and 82 being equally spaced around the periphery of the elements 66 and 68. A pair of magnetic pickups 84 and 86 are respectively mounted adjacent to the circular paths traced by the teeth 80 and 82 during rotation of the shaft 50, each pickup 84 and 86 producing a small voltage as a tooth moves past the end of the pickup, the electric signals or voltages produced by the pickups 84 and 86 being transmitted to a control console 87 mounted on the operator's station 28 by a cable 88. The angular spacing between adjacent teeth 80 and 82 on the elements 66 and 68 respectively is identified by the letter A in FIGS. 4 and 9, while the time delay between the electric signals produced by succeeding teeth passing the magnetic pickups is identified by the letter B in the graphs shown in FIGS. 5–8 and 10–13. When the torque in the shaft 50 is less than the amount required to overcome the preload on the springs 74, the teeth 80 and 82 on the elements 66 and 68 are in axial alignment, and each tooth 80 passes the pickup 84 simultaneously with a tooth 82 passing the pickup 86, the signal or voltage generated by the pickup 84 being graphically illustrated in FIG. 5, while the signal generated in the pickup 86 being graphically illustrated in FIG. 6.

The signals from the pickups 84 and 86 are fed to a modifier circuit, which is mounted in the control console 87 and is represented by the functional box 89 in FIGS. 4 and 9, the modifier circuit 89 producing a signal which is a function of the time delay between the corresponding signals from the pickups 84 and 86. The output of the modifier circuit 89 is in turn transmitted to a filter, represented by the functional box 90 in FIGS. 4 and 9, which produces a voltage which is a function of the modifier circuit output. As shown in FIG. 7, when the signals from the pickups 84 and 86 are simultaneous, the output of the modifier circuit 89 is insignificant, resulting in a zero output voltage in the filter 90, as graphically illustrated in FIG. 8.

However, when the shaft 50 is transmitting a torque sufficient to overcome the preload on the springs 74, the springs 74 will extend, permitting a relative angular deflection between the members 66 and 68 so that the teeth 82 on the member 68 are unaligned with the teeth 80 on the members 66. In FIG. 9, the sensing device is schematically illustrated during such a torque transmission, the amount of angular deflection between the elements 66 and 68 being identified by the letter C. The time delay between the signals produced by the pickups 84 and 86 for such an angular deflection is identified by the letter D in the graphs which comprise FIGS. 10–13, FIG. 10 being a graphical illustration of the signal produced by the pickup 84 and FIG. 11 being an illustration of the signal produced by the pickup 86. When said signals are fed to the modifier circuit 89, a series of voltage signals is produced, the duration of each signal corresponding to the time delay D as shown in FIG. 12. The filter 90 converts this series of signals to a voltage signal which remains constant as long as the torque in the shaft 50 is constant, the voltage signal being graphically illustrated in FIG. 13. Thus the filter 90 produces a voltage signal in the line 92, which is proportionate to the torque in the shaft 50, and since the torque in the shaft 50 is a function of the amount of torque required to drive the reel 42, cutter bar 40, and auger 44, which varies according to the amount of crop being cut and handled, the voltage signal in the line 92 or feed rate signal is a function of the rate at which the crop is being handled by the three header components.

The feed rate signal is fed to a feed rate gate, illustrated by the functional box 94 in FIG. 2, and the feed rate gate compares the feed rate signal in the line 92 with a feed rate reference signal 95, which is a voltage signal which can be selectively varied by any conventional means by the operator at the operator's station, the means for varying the preset feed rate signal being illustrated by the functional box 96. Of course, the optimum feed rate for harvesting efficiency varies according to the particular crop and crop conditions, and a predetermined feed rate is selectively adjusted at the rate which will provide maximum harvesting efficiency. When the actual feed rate is greater than the preselected feed rate, the feed rate signal of course differs from the feed rate reference signal 95, in which case the feed rate gate 94 produces a feed rate error signal 98, which is fed to a control summer and driver represented by the functional box 100.

The actual ground speed of the combine is measured by any conventional speed measuring device represented by the functional box 102, the device producing an electric signal 104 which is a function of the combine ground speed, the speed sensing device preferably being associated with the transmission 32 to sense the ratio therein and produce an electric signal, which is a function of the transmission ratio and is also fed to the control summer and driver 100.

The maximum ground speed of the combine can be selectively adjusted by the operator from the operator's station by a means, illustrated by the functional box 106, for producing an electric signal 108, which varies according to the maximum combine speed desired. The means for adjusting the preselected maximum combine speed can be any conventional means for producing a variable voltage signal.

The control summer and driver 100 compares the velocity signal 104, the velocity reference signal 108, and the feed rate error signal 98; and if there three signals are not balanced, the control summer and driver 100 produces an error signal 110, which actuates a transmission ratio actuator, represented by the functional box 112, which changes the ratio in the infinitely-variable transmission until the ground speed of the combine is such that the three input signals to the control summer and driver 100 are balanced. The transmission ratio actuator could be any type of electric or hydraulic motor, which, in a hydrostatic drive, could control the swash plate of the hydrostatic pump or motor, or, in an infinitely-variable belt drive, could control the ratio in one or more of the variable diameter pulleys. The error signal 110 could actuate the transmission ratio actuator 112 by any means such as a solenoid-operated switch or control valve.

When no feed rate error signal 98 exists, which is the case when the actual crop feed rate equals or is less than the preselected feed rate, the control summer and driver 100 compares only the actual velocity of the combine, as characterized by the velocity signal 104, and the preselected maximum combine velocity, which is characterized by the velocity reference signal 108. If the velocity signal 104 is less than the velocity reference signal 108, the control summer and driver 100 will produce an error signal which causes the combine velocity to increase until the signals 104 and 108 are equal, and then, provided there is no feed rate error signal, the error signal 110 will disappear and the combine will travel at the preselected maximum velocity. If the actual velocity starts to exceed the preselected velocity, an error signal 110 will be produced which will actuate the transmission ratio actuator to reduce the transmission ratio so that the actual velocity equals the preselected velocity.

If the crop feed rate, characterized by the feed rate signal in the line 92, exceeds the preselected feed rate, characterized by the feed rate reference signal 95, a feed rate error signal 98 will be produced, which will cause the control summer and driver 100 to produce an error signal 110, which will actuate the transmission ratio actuator 112 to reduce the combine ground speed until the feed rate error signal disappears. Thus, the control system will automatically adjust the ratio in the infinitely-variable drive and consequently the combine ground speed to maintain a crop feed rate, which corresponds to the preselected crop feed rate, while permitting the feed rate to fall below the preselected feed rate, when the maximum preselected combine ground speed is reached.

The entire control system in the preferred embodiment is electrical and can therefore be placed at almost any location on the combine, since the various signals can be transmitted through wires. The means for providing the feed rate reference signal 95 and the velocity reference signal 108 are preferably located at the operator's station, so that the operator can adjust the crop feed rate and maximum ground speed during operation of the machine. Of course, the above-described control functions can also be acomplished through hydraulic or mechanical servo mechanisms, or various combinations thereof with electric control means, although it is contemplated that the electric control system described herein offers the most practical system. Other means for sensing the crop feed rate could be incorporated in the control system described herein within the scope of the present invention, and other torque sensing devices could also be utilized other than the preferred embodiment illustrated herein without departing from the scope of the present invention.

Although the torque sensing device could be placed at different locations to sense the crop feed rate, it is one of the features of the invention to locate the device to sense the total power input to the header. In the illustrated embodiment, the header 38 is described as separate from the feeder house 36, although it is intended that the term "header" as used in the claims could also include the feeder house, since in many combines the feeder house is an integral part of the header. Thus, the sensing device 58 could be located to sense the torque input to the feeder house conveyor in addition to the other header components within the scope of the invention.

We claim:
1. In a harvesting machine having a main body mounted on a plurality of drive wheels, a substantially constant speed power source, a variable ratio propulsion drive connecting the power source to the drive wheels for driving the machine at variable speeds for any given speed of the power source, and a crop handling means including a drive means connected to the power source for driving the crop handling means at a predetermined ratio, the improvement residing in a control system for controlling the ratio in the propulsion drive and comprising: a feed rate sensing means operatively connected to the crop handling means for producing an electric feed rate signal proportional to the feed rate in the crop handling means; mean for providing an electric feed rate reference signal which is a function of a preselected feed rate; means for comparing the feed rate signal and the feed rate reference signal for producing a feed rate error signal when the feed rate exceeds the preselected feed rate; a velocity transducer adapted to produce an electric velocity signal proportional to the machine ground speed; means for providing an electric velocity reference signal which is the function of a preselected machine ground speed; and electronic means responsive to the feed rate error signal, the velocity signal, and the velocity reference signal for producing a drive ratio error signal which is a function of the feed rate error signal except when the feed rate in the crop handling means is less than the preselected feed rate and the ground speed is equal to or greater than the preselected ground speed; and transmission actuating means operatively connected to the propulsion drive and responsive to the drive ratio error signal for changing the ratio in said drive until a zero error signal is achieved, whereby a substantially constant feed rate is automatically maintained in the crop handling means as long as the machine ground speed is less than the preselected ground speed.

2. The invention defined in claim 1 wherein the crop handling means includes a drive means, and the feed rate sensing means is operatively connected to the said drive means to produce an electric signal proportional to the power transmitted thereby.

3. The invention defined in claim 2 wherein the machine includes a forward harvesting header and the crop handling means includes crop gathering means on the header for moving crops from the field to the main body as the machine advances, and the crop handling drive means includes a header drive for driving said crop gathering means, and the sensing means is connected to the header drive for sensing the power transmitted thereby.

4. In a harvesting machine having a main body mounted on a plurality of drive wheels, a substantially constant speed power source, a variable ratio propulsion drive connecting the power source to the drive wheels for driving the machine at variable speeds for any given speed of the power source, and a crop handling means including a drive means connected to the power source for driving the crop handling means at a predetermined ratio, the improvement comprising: a torque sensing means operatively associated with the crop handling drive means for sensing at least part of the torque transmitted thereby and including coaxially rotatable drive and driven elements, a spring means drivingly interconnecting the drive and driven elements and deflectable in response to the drive force transmitted therethrough to permit limited relative rotation between the elements, first and second magnetic pickup means respectively associated with the drive and driven elements to produce electric signals as the elements rotate; and means responsive to the electric signals for producing a feed rate signal that is a function of the relative angular positions of the drive and driven elements; and control means responsive to said feed rate signal and operatively associated with the propulsion drive for adjusting the ratio in the propulsion drive.

5. In a harvesting machine having a main body mounted on a plurality of drive wheels, a substantially constant speed power source, a variable ratio propulsion drive connecting the power source to the drive wheels for driving the machine at variable speeds for any given speed of the power source, a forwardly disposed header having a crop gathering means for removing the crop from the field as the machine advances and delivering it rearwardly to the main body and including a header drive means drivingly connecting the power source to the crop gathering means, the improvement residing in a control system for controlling the ratio in the propulsion drive and comprising: coaxial, relatively rotatable, drive and driven elements disposed in the header drive, a spring means drivingly connecting the drive and driven elements and deflectable to permit said relative rotation between the drive and driven elements in proportion to the driving force transmitted therethrough; a feed rate transducer means operatively connected to said elements to provide an electric signal in proportion to the angular deflection between said elements; and a control means operatively connected to the propulsion drive and responsive to said electric signal to automatically adjust the propulsion drive to any ratio less than a preset ratio to maintain a relatively constant driving force in said header drive means at ground speeds less than that provided by the preset ratio.

6. In a self-propelled harvesting machine having a main body mounted on a pair of drive wheels and including a crop separating means, a substantially constant speed power source mounted thereon, a variable ratio propulsion drive connecting the power source to the drive wheels for propelling the machine at variable ground speeds, a forwardly disposed header having a plurality of driven elements for removing the crop from the field as the machine advances and delivering it rearwardly toward the separating means, and a header drive means drivingly connecting the driven header elements to the power source, the improvement comprising: a torque sensing means operatively connected to the header drive means for sensing the total driving torque transmitted to the driven header elements, and a control means responsive to the sensing means and operatively associated with the propulsion drive for automatically adjusting the ratio in the propulsion drive, the header drive means including a transverse header drive shaft journaled on a rearward portion of the header and having input and output portions, and the torque sensing means including first and second coaxial, relatively rotatable elements respectively connected to the input and output portions, and a spring means drivingly interconnecting the first and second elements and deflectable in response to the torque transmitted therethrough to permit relative rotation between the elements, the relative rotation being a function of the torque transmitted through said shaft, and transducer means operative to produce a signal responsive to the relative angular positions of said elements.

References Cited
UNITED STATES PATENTS

| 3,073,099 | 1/1963 | Andersen | 56—20 |
| 3,093,946 | 6/1963 | Pitt et al. | 56—20 |
| 3,138,908 | 6/1964 | Budzich | 56—20 |

E. BARRY SHAY, Primary Examiner

JAMES A. OLIFF, Assistant Examiner